(12) United States Patent
Moskowitz

(10) Patent No.: US 8,763,066 B2
(45) Date of Patent: Jun. 24, 2014

(54) TELEVISION SIGNAL DATA DELIVERY SYSTEM

(75) Inventor: Alan Moskowitz, Oakland, CA (US)

(73) Assignee: TiVo Inc., Alviso, CA (US)

(*) Notice: Subject to any disclaimer, the term of this patent is extended or adjusted under 35 U.S.C. 154(b) by 975 days.

(21) Appl. No.: 10/339,684

(22) Filed: Jan. 8, 2003

(65) Prior Publication Data

US 2003/0131359 A1 Jul. 10, 2003

Related U.S. Application Data

(60) Provisional application No. 60/347,181, filed on Jan. 8, 2002.

(51) Int. Cl.
| | |
|---|---|
| *H04N 7/16* | (2011.01) |
| *G06F 3/00* | (2006.01) |
| *G06F 13/00* | (2006.01) |
| *H04N 5/445* | (2011.01) |
| *H04N 21/236* | (2011.01) |
| *H04N 21/262* | (2011.01) |
| *H04N 21/435* | (2011.01) |
| *H04N 21/81* | (2011.01) |

(52) U.S. Cl.
CPC .......... *H04N 21/236* (2013.01); *H04N 21/262* (2013.01); *H04N 21/435* (2013.01); *H04N 21/8166* (2013.10)
USPC .............. 725/135; 725/50; 725/139; 725/140

(58) Field of Classification Search
USPC ........................................... 348/463
See application file for complete search history.

(56) References Cited

U.S. PATENT DOCUMENTS 4,536,791 A * 8/1985 Campbell et al. ............... 725/28
5,404,505 A * 4/1995 Levinson ................ 348/E7.069

(Continued)

OTHER PUBLICATIONS

State Intellectual Property Office of P.R.C., "Notification of the First Office Action", Application No. 2005800395077, Applicant: Tivo Inc., Dated Mar. 27, 2009, 22 pages.

(Continued)

*Primary Examiner* — Oschta Montoya
(74) *Attorney, Agent, or Firm* — Hickman Palermo Truong Becker Bingham Wong LLP; Kirk D. Wong

(57) ABSTRACT

An analog television signal data delivery system provides a television program, called a data show, that is transmitted across standard television broadcast methods to data needy client systems, such as settop boxes, at certain times of the day. When the data show is recorded and specially demodulated it provides the client system with raw digital data to perform required or enhanced functions. Binary digital data is modulated into each frame of the data show. Each of the 480 scan lines in a frame have data modulated into it. Each scan line in the frame contains two bytes which yields 28800 bytes/sec. This high transfer rate results in an efficient data transfer method that is cost effective and easily broadcast. Another preferred embodiment of the invention designates some regions of the active video picture to contain visible images and other regions of the active picture to contain data. The non-data portions can be placed anywhere on the viewable frame. The client system receiver knows the channel, time, and duration that the data show is being broadcast. At the data show time, the client system records the data show on its local storage device and demodulates and decodes the data show at a later time or demodulates and/or decodes the data show on the fly. Once demodulated and/or decoded, the data are used as intended.

48 Claims, 6 Drawing Sheets

(56) References Cited

U.S. PATENT DOCUMENTS

| | | | |
|---|---|---|---|
| 5,603,077 A * | 2/1997 | Muckle et al. | 455/3.02 |
| 6,144,402 A * | 11/2000 | Norsworthy et al. | 725/109 |
| 6,571,392 B1 * | 5/2003 | Zigmond et al. | 725/110 |
| 6,609,253 B1 * | 8/2003 | Swix et al. | 725/88 |
| 6,701,526 B1 * | 3/2004 | Trovato | 725/39 |
| 7,941,818 B2 * | 5/2011 | Ward et al. | 725/42 |
| 2002/0013948 A1 * | 1/2002 | Aguayo et al. | 725/91 |
| 2002/0184634 A1 * | 12/2002 | Cooper | 725/51 |
| 2007/0234391 A1 * | 10/2007 | Hunter et al. | 725/87 |

OTHER PUBLICATIONS

Claims, Application No. 2005800395077, Applicant: Tivo Inc., 5 pages.

\* cited by examiner

TELEVISION SIGNAL DATA DELIVERY SYSTEM

CROSS REFERENCE TO RELATED APPLICATIONS

This application claims benefit of U.S. Provisional Patent Application Ser. No. 60/347,181, filed on Jan. 8, 2002.

BACKGROUND OF THE INVENTION

1. Technical Field

The invention relates to the distribution of digital data across an analog signal in a computer environment. More particularly, the invention relates to delivering digital data to a client system in a computer environment using an analog television signal.

2. Description of the Prior Art

Settop boxes were first introduced to the public when cable television carriers began scrambling television signals to prevent the unauthorized reception of their cable signals. A settop box was placed between the incoming cable line and the customer's television set. Scrambled incoming cable television signals were received by the settop box and remodulated to a standard analog television signal which was sent to the television set.

Since then, settop boxes have evolved into microprocessor-based systems that perform a myriad of functions. Settop boxes receive and decode encoded television signals and convert the signals to ones that are compatible with television sets. Cable and satellite carriers send messages to customers using settop boxes. Services such as pay-per-view are ordered by customers using settop boxes. Internet access has also been offered through settop boxes.

The most recent evolutionary stage of the settop box is the Digital Video Recorder (DVR). The DVR records television program material on an internal hard disk. The DVR functionality is typically complicated and requires computer software and television program data to operate.

In virtually all settop box environments today the settop device needs a dedicated set of data to perform its operations. Most systems today use a phone line as an out of band data channel to both receive and transmit data. Given the fact that every phone call from a settop box has a cost, such costs would be greatly reduced if the data required by the settop box were to be broadcast to all receivers over a shared medium.

It would be advantageous to provide an analog television signal data delivery system that provides data delivery via a low-cost television signal. It would further be advantageous to provide an analog television signal data delivery system that enables data to be broadcast to a plurality of receivers simultaneously.

SUMMARY OF THE INVENTION

The invention provides an analog television signal data delivery system. The system provides data delivery to client systems via a low-cost television signal. In addition, the invention enables data to be broadcast to a plurality of client systems simultaneously.

The invention provides a television program, called a data show, that is transmitted across standard television broadcast methods to data needy client systems, such as settop boxes, at certain times of the day. When the data show is recorded and specially demodulated it provides the client system with raw digital data to perform required or enhanced functions.

The invention modulates binary digital data into each frame of the data show. Each of the 480 scan lines in a frame have data modulated into it using the Consumer Electronics Association (CEA) NTSC closed caption scheme (EIA-608). Each scan line in the frame contains two bytes which yields 28800 bytes/sec.

This high transfer rate results in an efficient data transfer method that is cost effective and easily broadcast.

Another preferred embodiment of the invention designates some regions of the active video picture to contain visible images and other regions of the active picture to contain data. To the normal television viewer, the data modulated portion of a frame in a data show looks like a "snowy signal." The non-data portions can be placed anywhere on the viewable frame.

The client system receiver knows the channel, time, and duration that the data show is being broadcast. At the data show time the client system reconfigures its input section from video mode into data mode and tunes to the specified channel. The client system can then record the data show on its local storage device and demodulates and/or decodes the data show at a later time or demodulates and/or decodes the data show on the fly. Once demodulated, the data are used as intended if the download was complete.

At the end of the duration of the data show, the input section of the client system is reconfigured for standard video mode and operates in a normal manner.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in an analog television signal data delivery system. A system according to the invention provides data delivery to client systems via a low-cost television signal. In addition, the invention enables data to be broadcast to a plurality of client systems simultaneously.

The invention provides an authoring, delivery, and recording system for data consumed by a client system. Client systems record the data delivered over a television signal and decode the data. Once the data download is complete, the client system installs the data as needed. The data are any type of digital data that can be used by a microprocessor-based system, examples include: software, program data, electronic program guides, databases, encrypted content, etc.

Client systems include settop boxes such as: cable boxes, Internet settop boxes, and Digital Video Recorders. These unit are not necessarily separate stand alone unit and are sometimes built into other devices such as television sets. The main features that the client systems share is that they require data and they have the ability to receive television signals.

Figure 1:
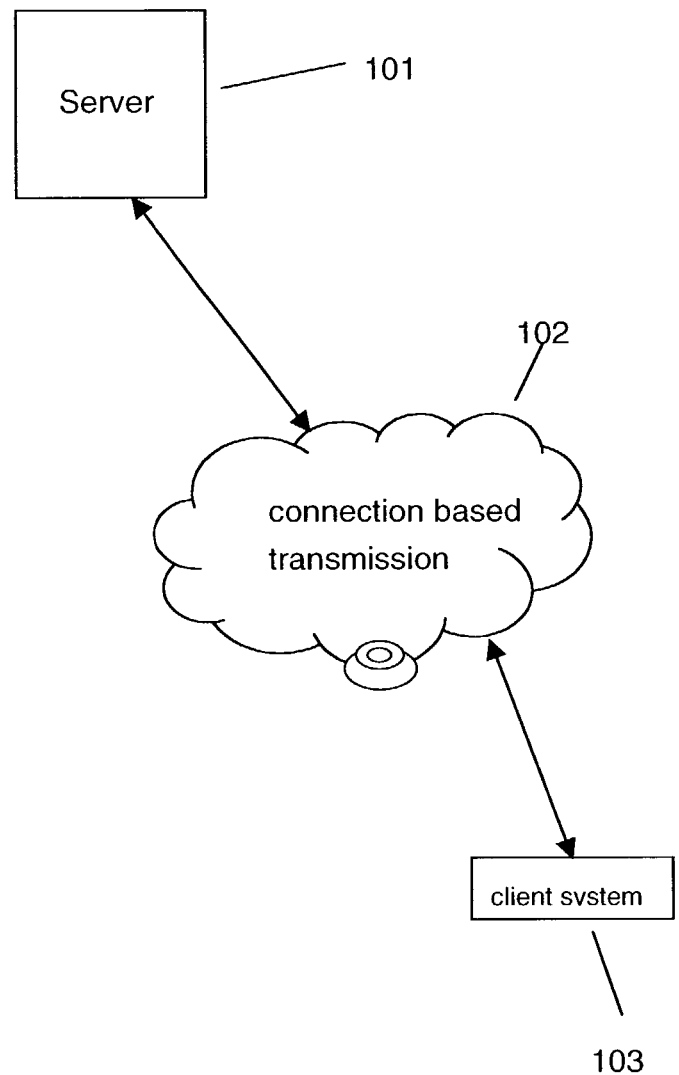
FIG. 1 is a block schematic diagram of a prior art approach of using connection based transmission media to download data to client systems according to the invention.

Referring to FIG. 1, client systems 103 such as television settop boxes have typically used out of band connection based transmission media 102 (telephone, Internet, DSL, cable modem, etc.) to download data from servers 101. There are several drawbacks to using connection base transmission media. The first is that these type of connections require large amounts of scalable hardware to receive and service requests from client systems. A second drawback is that the connection based transmission media create additional costs for the operator to operate and maintain the equipment and connections to the client systems. Another drawback is that communicating with a large number of client systems takes time; each client must be serviced independently.

Some television settop boxes use the Vertical Blanking Interval (VBI) portion of a television signal to receive electronic program guide data. However, the bandwidth of the VBI is not high enough to provide large amounts of data in a short amount of time.

The invention provides a television program, called a data show, to data needy settop boxes at certain times of the day. When the data show is recorded and specially demodulated it will provide the settop box with raw digital data to perform required or enhanced functions.

Figure 2:
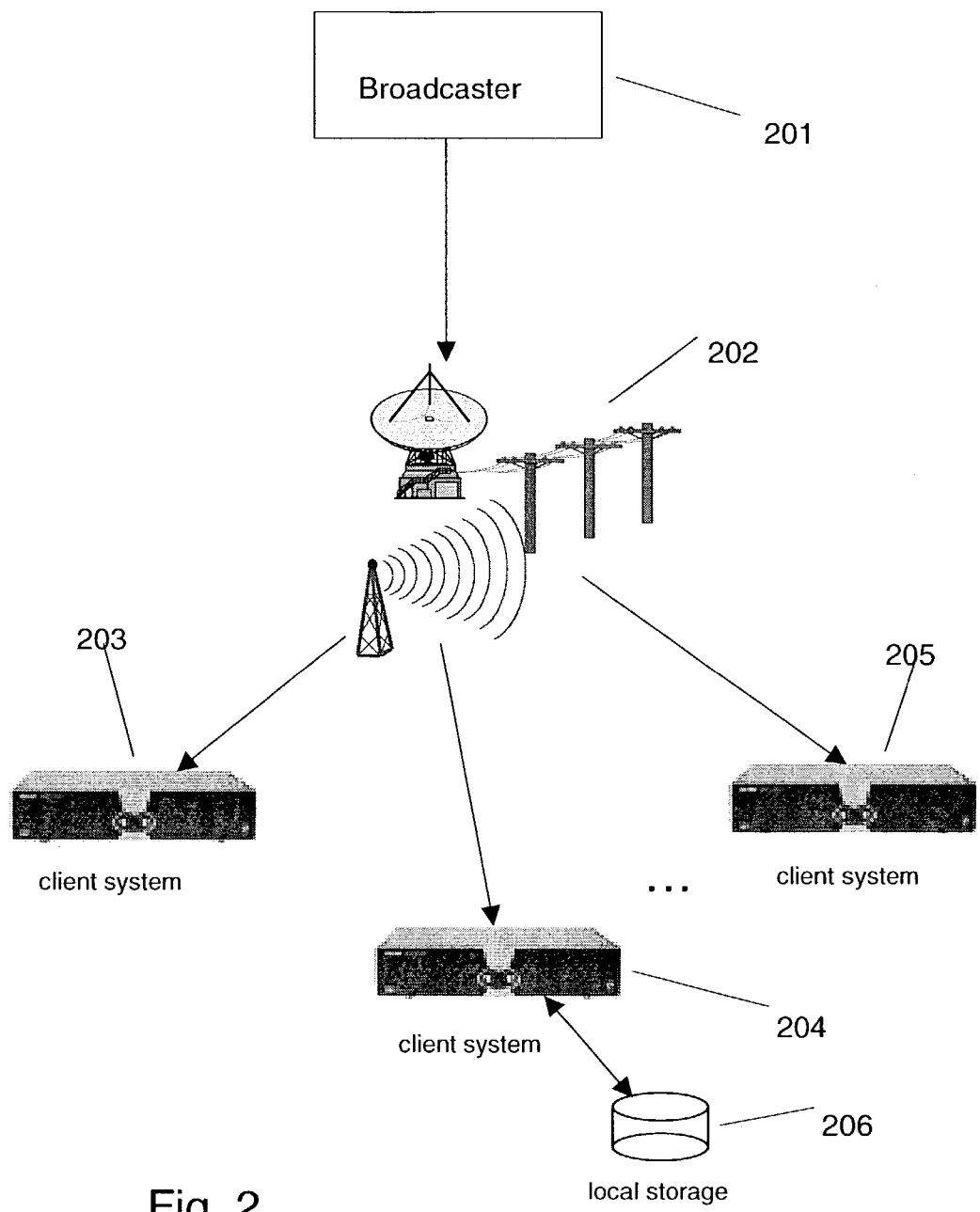
FIG. 2 is a block schematic diagram of the transmission path of a data show according to the invention.

With respect to FIG. 2, having a data show originate from a broadcaster 201 and transmitted across standard television broadcast methods 202 (e.g., satellite, cable, and aerial signals), allows a large number of client systems 203, 204, 205 to simultaneously receive a software update, for example. This solves the problems with connection based transmission media described above. Having a signal that is broadcast nationally across multiple carriers offers a cost effective approach to data delivery. Settop boxes simply tune into the data show channel at a predetermined time much like tuning into a normal television show.

Television broadcast systems produce moving images on receivers by sending multiple pictures (frames) per seconds. These pictures are made up of many scan lines, some visible, some not. In a video program these scan lines are created so as to reproduce the visual picture.

Figure 3:
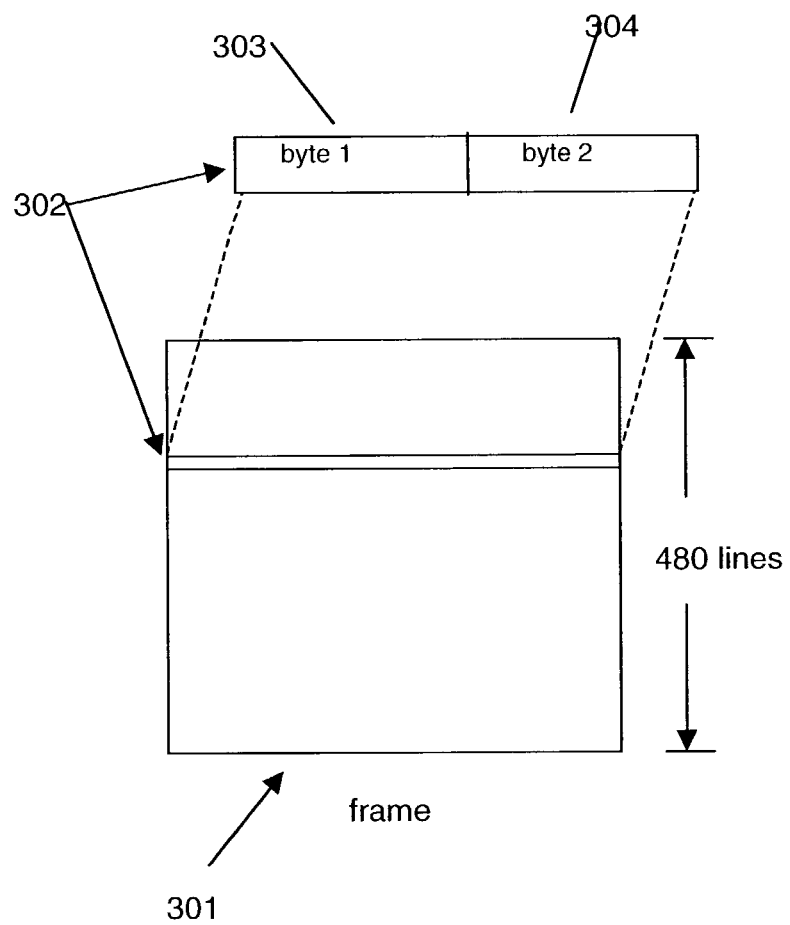
FIG. 3 is a block schematic diagram showing how each scan line in a video frame is used to modulate binary data according to the invention.

Referring to FIG. 3, the invention modulates data into each frame 301 of the data show. A frame 301 has 480 scan lines. Each of the 480 scan lines have data modulated into it using the Consumer Electronics Association (CEA) NTSC closed caption scheme (EIA-608).

EIA-608 closed captions are captions formatted and presented in the current analog television system and carried in the two fields of line 21 of the vertical blanking interval. Field one contains CC1, CC2, T1, and T2 (the latter being text services) and field 2 contains CC3, CC4, T3, and T4. CC1 is most often used to carry verbatim English captions and CC3 is increasingly being used for Spanish-language captions and captions edited for young children. EIA-708B is the standard for conveying caption data in a digital television signal. EIA-608 is easily converted to EIA-708B format. Many television scan line modulation schemes exist today with the most popular ones being EIA-608 and Teletext.

One skilled in the art will readily appreciate that although EIA-608 is mentioned above, any modulation scheme can be used in place of EIA-608.

Line 21 is not visible on the television screen when the program material is viewed. The line 21 modulation scheme allows two bytes to be sent in line 21 in each frame. There are 30 frames a second. This means that a typical television program can transmit 60 bytes per second over line 21.

A preferred embodiment of the invention utilizes the entire frame 301. Each scan line 302 in the frame 301 contains two bytes 303, 304. Using the entire frame yields:

$$2 \text{ bytes} \times 480 \text{ lines} \times 30 \text{ frames}/sec. = 28800 \text{ bytes}/sec.$$

This high transfer rate results in an efficient data transfer method that is cost effective and easily broadcast. The viewability of the data show is not a concern (as in a video program) because the settop box tunes to the data show channel at a time where the user is not using the settop box.

In a data show, desired scan lines are modulated so as to contain binary digital data. There is no rule that all scan lines of a given data show need to be modulated data.

Figure 4:
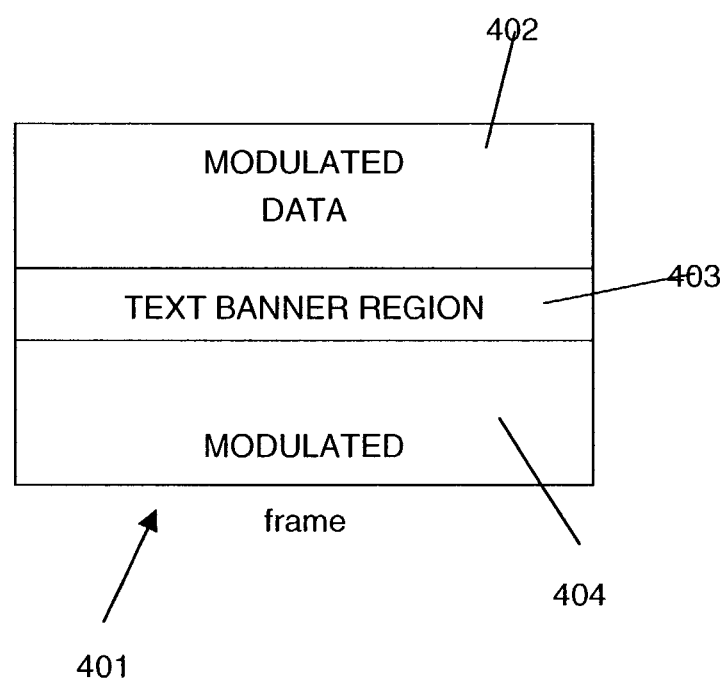
FIG. 4 is a block schematic diagram showing how visible regions in a video frame are mixed with modulate binary data according to the invention.

With respect to FIG. 4, another preferred embodiment of the invention has some regions of the active video picture containing visible images 403. To the normal television viewer, the data modulated portion 402, 404 of a frame 401 in a data show looks like a "snowy signal." Given this, it has been advantageous to have a portion 403 (or portions) of the video not encoded with data, but having an informational banner. The non-data portions can be placed anywhere on the viewable frame.

Recording of the Data Show

Figure 5:
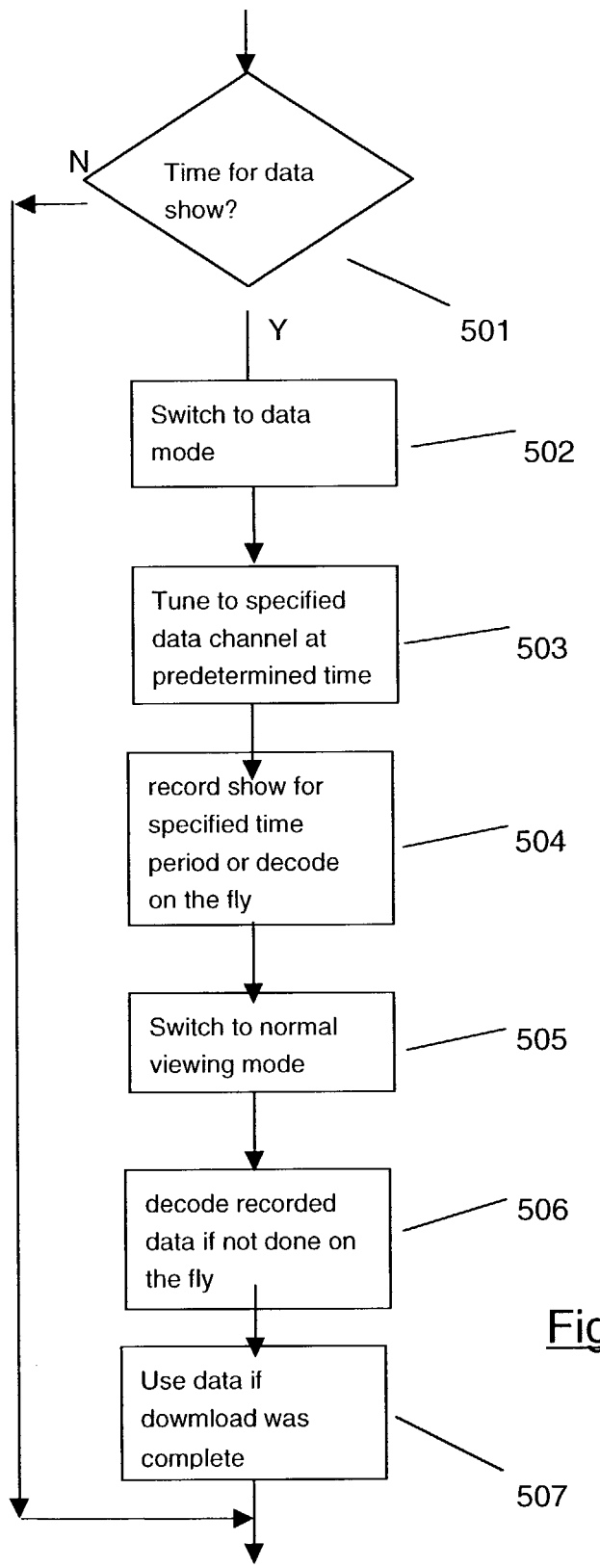
FIG. 5 is a block schematic diagram showing a flowchart of the steps taken in a client system when receiving a data show according to the invention.

Referring to FIGS. 2 and 5, through some mutually agreed upon mechanism, the client system receiver 203, 204, 205 needs to know the channel, time, and duration that the data show is being broadcast. For example, program guide data is sent to the client system that is a DVR. The client system knows the title of the data show and it can schedule data show recordings when it finds the data show in the most recently downloaded program guide data. A regularly scheduled data show can be broadcast so the client systems have a regular source of data updates (e.g., electronic program guides).

At the data show time 501 the client system 204 reconfigures its input section from video mode into data mode 502 and tunes to the specified channel 503. The client system 204 can then record the data show on its local storage device 206 or demodulate and/or decode the data show on the fly 504. The parameters for which video lines contain modulated data and which video lines contain true video can be either previously agreed upon or embedded in a well known location of the data show.

Many different approaches to partitioning data in a data show can be used. One example places a header at the beginning of the data so the client system can identify the beginning of the data. The client system discards everything read up to the header. The client system can then decode up until the time the data show ends. Another example places an end tag at the end of the data so the client system knows when to stop decoding in spite of when the end of the data show is scheduled (broadcast times can be inaccurate between carriers).

A further example segments the data using headers and end tags to partition the data into smaller segments. This allows easy recovery for the client system in case of an interrupted signal. The client system knows where it left off in the decoding sequence and can read and discard data up to that point in a subsequent data show (if the subsequent data show is the same as the interrupted data show).

Since the television broadcast signal is subject to environmental, transmission and line quality conditions an error correction code, such as Reed-Solomon, can be used to correct errors introduced during the transmission and reception process. The error correction is performed when the entire data show is received or, in the case of segmented data, when each segment is received.

At the end of the duration of the data show, the input section of the client system 204 is reconfigured for standard video mode and then operates in a normal manner 505.

Once demodulated, the data can then be stored to memory or a local storage device 206. If stored, a post processing phase can begin where the data is transformed into a format similar to the data used from a phone call in a connection based system, in which case a high level of software reuse occurs (making client systems easily modified to use the invention), or the data are used as intended if the download was complete 507.

If the data was recorded, then the data are read from the local storage device 206 and demodulated and/or decoded 506 before being used 507.

Data Show Authoring

An intricate aspect of the invention is the creation of the data show. In most broadcast systems, tapes are used as the mechanism for storage and broadcast playback. Therefore, to author a data show an authoring system with a digital frame buffer where individual lines of modulated data can be composited (along with a non-data video only region) and then recorded onto tape is needed. One such embodiment is a computer with a Serial Digital Output PCI card. Such a card has the ability to digitally author any type of video and then transmit the video in SMPTE-259 format into a video tape recorder for recording (many broadcast quality video tape recorders have a SMPTE-259 digital input).

This authoring process can occur in any physical location. The tape is then delivered to the broadcaster. The most optimal location is to have authoring occur at the physical distribution/uplink plant. This would prevent a costly and risky shipment of the tape. Of course, with the authoring process at the physical distribution/uplink plant at a digital transmission facility, the digital output of the authoring system can be directly stored and used.

The End-To-End Process

Figure 6:
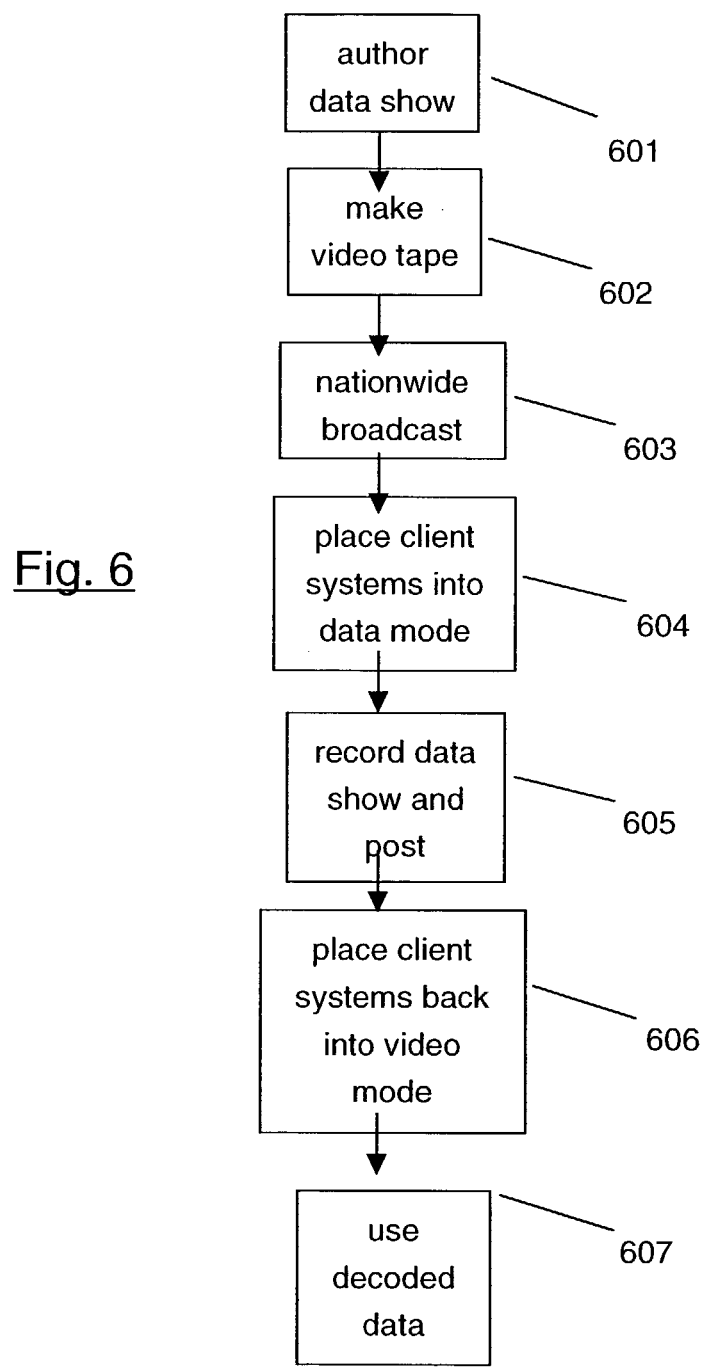
FIG. 6 is a block schematic diagram showing the invention's process of authoring a data show through the use of binary data in a data show by a client system according to the invention.

With respect to FIG. 6, the end-to-end process is begun with a data set needed by the client system. This data is authored into a data show 601 and recorded onto a video tape or other media 602. At a predetermined time, also known by the client system, the tape is then played by a local or nationwide broadcaster 603, such as Discovery Networks.

The feed from the broadcaster is then received by the local cable company and retransmitted locally. The data show is then present at the input of the client system, at which point the input section of the receiver is configured for data 604. The client system then begins to demodulate the data show 605. At this point or later, the data is post processed and used 605.

The client system is placed back into video mode where the client system can operate normally 606. The decoded data is then consumed by the client system in the manner that the data are intended to be used 607.

In order to allow for flexibility for the user, the data show may be broadcast multiple times per day or week or however often needed.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for receiving television broadcast signals carrying data for client systems, comprising:

receiving, by a client system among a plurality of client systems, electronic program guide data, the client system of the plurality of client systems searching the electronic program guide data for a title of a data show and obtaining a channel and time that the data show is being broadcast from the electronic program guide data, the data show having binary data intended for client systems modulated in each frame of the data show and each entire frame is used to modulate the binary data;

receiving the data show on the client system via a television signal, the client system automatically selecting the channel at the broadcast time, the client system automatically switches from a video mode to a data mode while receiving the data show;

decoding, by the client system, the binary data in the received data show into a software update for the client system.

2. The method of claim 1, wherein each video scan line used to modulate binary data in a frame contains two bytes of data.

3. The method of claim 1, wherein each video scan line used to modulate binary data in a frame is modulated using closed captioning standard EIA-608.

4. The method of claim 1, wherein each client system is notified of a specified duration that the data show is being broadcast.

5. The method of claim 4, wherein a client system tunes to the channel that the data show is being broadcast for the specified duration.

6. The method of claim 1, wherein a client system records the data show on a local storage device, wherein the client system demodulates and decodes the recorded data show after the recording is completed, and wherein the demodulated and decoded data are consumed by the client system in a manner that the data are intended to be used.

7. The method of claim 1, wherein a client system demodulates and decodes the data show on the fly, and wherein the demodulated and decoded data are consumed by the client system in the manner that the data are intended to be used.

8. The method of claim 1, wherein parameters indicating which video scan lines in a frame contain modulated data and which video scan lines contain true video are either previously agreed upon or embedded in a well known location of the data show.

9. The method of claim 1, wherein a header is placed at a beginning of the binary data in the data show so a client system can identify the beginning of the binary data.

10. The method of claim 9, wherein the client system decodes the data show until a time the data show is scheduled to end.

11. The method of claim 9, wherein an end tag is placed at an end of the binary data in the data show, and wherein the client system stops decoding the binary data when the end tag is encountered.

12. The method of claim 1, wherein data in the data show are segmented using headers and end tags in each data segment to partition the data into smaller segments.

13. A method for creating and transmitting television broadcast signals carrying data for client systems, comprising:

creating a data show, the creating step modulates binary data intended for client systems in each frame of the data show;

modulating the binary data into visible and non-visible areas of each frame in the data show;

designating at least one sub-region of a frame's visible area to contain visible images instead of modulated binary data;

wherein a plurality of client systems search electronic program guide data for a title of the data show and obtain a channel and time that the data show is being broadcast from the electronic program guide data;

receiving the data show on the plurality of client systems via a television signal, each client system in the plurality of client systems automatically selecting the channel at the broadcast time, each client system automatically switches from a video mode to a data mode while receiving the data show;

decoding, by a client system in the plurality of client systems, the binary data in the received data show into a software update for the client system.

14. The method of claim 13, wherein each video scan line used to modulate binary data in a frame contains two bytes of data.

15. The method of claim 13, wherein each video scan line used to modulate binary data in a frame is modulated using closed captioning standard EIA-608.

16. The method of claim 13, wherein each client system is notified of a specified duration that the data show is being broadcast.

17. The method of claim 16, wherein a client system tunes to the channel that the data show is being broadcast for the specified duration.

18. The method of claim 13, wherein a client system records the data show on a local storage device, wherein the client system demodulates and decodes the recorded data show after the recording is completed, and wherein the demodulated and decoded data are consumed by the client system in a manner that the data are intended to be used.

19. The method of claim 13, wherein a client system demodulates and decodes the data show on the fly, and wherein the demodulated and decoded data are consumed by the client system in a manner that the data are intended to be used.

20. The method of claim 13, wherein parameters indicating which video scan lines in a frame contain modulated data and which video scan lines contain true video are either previously agreed upon or embedded in a well known location of the data show.

21. The method of claim 13, wherein a header is placed at a beginning of the binary data in the data show so a client system can identify the beginning of the binary data.

22. The method of claim 21, wherein the client system decodes the data show until the time the data show is scheduled to end.

23. The method of claim 21, wherein an end tag is placed at an end of the binary data in the data show, and wherein the client system stops decoding the binary data when the end tag is encountered.

24. The method of claim 13, wherein data in the data show are segmented using headers and end tags in each data segment to partition the data into smaller segments.

25. An apparatus for receiving television broadcast signals carrying data for client systems, comprising:

a data show schedule receiving subsystem, on a client system among a plurality of client systems, that receives electronic program guide data, the client system searches the electronic program guide data for a title of a data show and obtains a channel and time that the data show is being broadcast from the electronic program guide data, the data show having binary data intended for client systems modulated in each frame of the data show and each entire frame is used to modulate the binary data;

a data show receiving subsystem, on the client system, that receives the data show via a television signal, the client system automatically selecting the channel at the broadcast time, the client system automatically switches from a video mode to a data mode while receiving the data show;

a decoding subsystem, on the client system, that decodes the binary data in the received data show into a software update for the client system.

26. The apparatus of claim 25, wherein each video scan line used to modulate binary data in a frame contains two bytes of data.

27. The apparatus of claim 25, wherein each video scan line used to modulate binary data in a frame is modulated using closed captioning standard EIA-608.

28. The apparatus of claim 25, wherein each client system is notified of a specified duration that the data show is being broadcast.

29. The apparatus of claim 28, wherein a client system tunes to the channel that the data show is being broadcast for the specified duration.

30. The apparatus of claim 25, wherein a client system records the data show on a local storage device, wherein the client system demodulates and decodes the recorded data show after the recording is completed, and wherein the demodulated and decoded data are consumed by the client system in a manner that the data are intended to be used.

31. The apparatus of claim 25, wherein a client system demodulates and decodes the data show on the fly, and wherein the demodulated and decoded data are consumed by the client system in a manner that the data are intended to be used.

32. The apparatus of claim 25, wherein parameters indicating which video scan lines in a frame contain modulated binary data and which video scan lines contain true video are either previously agreed upon or embedded in a well known location of the data show.

33. The apparatus of claim 25, wherein a header is placed at a beginning of the binary data in the data show so a client system can identify the beginning of the binary data.

34. The apparatus of claim 33, wherein the client system decodes the data show until the time the data show is scheduled to end.

35. The apparatus of claim 33, wherein an end tag is placed at an end of the binary data in the data show, and wherein the client system stops decoding the binary data when the end tag is encountered.

36. The apparatus of claim 25, wherein data in the data show are segmented using headers and end tags in each data segment to partition the data into smaller segments.

37. An apparatus for creating and transmitting television broadcast signals carrying data for client systems, comprising:

a data show creation subsystem that creates a data show, the data show creation subsystem modulates binary data intended for client systems in each frame of the data show, the data show creation subsystem modulates the binary data into visible and non-visible areas of each frame in the data show, the data show creation subsystem designates at least one sub-region of a frame's visible area to contain visible images instead of modulated binary data;

wherein a plurality of client systems search electronic program guide data for a title of the data show and obtain a channel and time that the data show is being broadcast from the electronic program guide data;

a data show receiving subsystem, on each client system in the plurality of client systems, that receives the data show via a television signal, each client system automatically selecting the channel at the broadcast time, each client system automatically switches from a video mode to a data mode while receiving the data show;

a decoding subsystem, on a client system in the plurality of client systems, that decodes the binary data in the received data show into a software update for the client system.

38. The apparatus of claim 37, wherein each video scan line used to modulate binary data in a frame contains two bytes of data.

39. The apparatus of claim 37, wherein each video scan line used to modulate binary data in a frame is modulated using closed captioning standard EIA-608.

40. The apparatus of claim 37, wherein each client system is notified of a specified duration that the data show is being broadcast.

41. The apparatus of claim 40, wherein a client system tunes to the channel that the data show is being broadcast for the specified duration.

42. The apparatus of claim 37, wherein a client system records the data show on a local storage device, wherein the client system demodulates and decodes the recorded data show after the recording is completed, and wherein the demodulated and decoded data are consumed by the client system in a manner that the data are intended to be used.

43. The apparatus of claim 37, wherein a client system demodulates and decodes the data show on the fly, and wherein the demodulated and decoded data are consumed by the client system in a manner that the data are intended to be used.

44. The apparatus of claim 37, wherein parameters indicating which video scan lines in a frame contain modulated binary data and which video scan lines contain true video are either previously agreed upon or embedded in a well known location of the data show.

45. The apparatus of claim 37, wherein a header is placed at a beginning of the binary data in the data show so a client system can identify the beginning of the binary data.

46. The apparatus Of claim 45, wherein the client system decodes the data show until the time the data show is scheduled to end.

47. The apparatus of claim 45, wherein an end tag is placed at an end of the binary data in the data show, and wherein the client system stops decoding the binary data when the end tag is encountered.

48. The apparatus of claim 37, wherein data in the data show are segmented using headers and end tags in each data segment to partition the data into smaller segments.

* * * * *